United States Patent
Dobbs

(10) Patent No.: US 9,568,235 B2
(45) Date of Patent: Feb. 14, 2017

(54) THERMAL ENERGY STORAGE IN A CHILLER SYSTEM

(71) Applicant: CARRIER CORPORATION, Farmington, CT (US)

(72) Inventor: Gregory M. Dobbs, Philadelphia, PA (US)

(73) Assignee: CARRIER CORPORATION, Farmington, CT (US)

( * ) Notice: Subject to any disclaimer, the term of this patent is extended or adjusted under 35 U.S.C. 154(b) by 261 days.

(21) Appl. No.: 14/350,424

(22) PCT Filed: Sep. 25, 2012

(86) PCT No.: PCT/US2012/057076
§ 371 (c)(1),
(2) Date: Apr. 8, 2014

(87) PCT Pub. No.: WO2013/055520
PCT Pub. Date: Apr. 18, 2013

(65) Prior Publication Data
US 2014/0298829 A1   Oct. 9, 2014

Related U.S. Application Data

(60) Provisional application No. 61/546,794, filed on Oct. 13, 2011.

(51) Int. Cl.
*F25B 27/00* (2006.01)
*F25D 1/00* (2006.01)
(Continued)

(52) U.S. Cl.
CPC ............... *F25D 1/00* (2013.01); *F24F 5/0021* (2013.01); *F25D 3/02* (2013.01); *Y02E 60/147* (2013.01)

(58) Field of Classification Search
CPC .................................... F25B 49/02; F25B 3/02
(Continued)

(56) References Cited

U.S. PATENT DOCUMENTS 5,090,207 A * 2/1992 Gilbertson .............. F25D 16/00
137/565.34
5,277,038 A * 1/1994 Carr ................... B60H 1/00492
165/10

(Continued)

FOREIGN PATENT DOCUMENTS

CN          1920421 A      2/2007
CN        101059259 A     10/2007
(Continued)

OTHER PUBLICATIONS

Notification of Transmittal of the International Search Report and the Written Opinion of the International Searching Authority, or the Declaration; PCT/US2012/057076; Dec. 12, 2012.
(Continued)

*Primary Examiner* — Melvin Jones
(74) *Attorney, Agent, or Firm* — Cantor Colburn LLP

(57) ABSTRACT

A method of operating an air conditioning system includes operating a refrigeration unit to cool a volume of refrigerant and circulating the refrigerant to a heat exchanger. A serviced space is cooled via a thermal energy exchange between the serviced space and the refrigerant at the heat exchanger. Thermal energy generated by operation of the refrigeration unit is stored at a thermal energy storage system. An air conditioning system includes a refrigeration unit and a heat exchanger operably connected to the refrigeration unit. The heat exchanger is configured to transfer thermal energy between a serviced space and the refrigeration unit, thus cooling the serviced space. A volume of thermal energy storage medium is utilized to absorb thermal heat generated by the refrigeration unit for dissipation into the ambient environment at a selected time.

14 Claims, 2 Drawing Sheets

(51) Int. Cl.
*F24F 5/00* (2006.01)
*F25D 3/02* (2006.01)

(58) Field of Classification Search
USPC ..................... 62/115, 126, 238.1, 430, 467
See application file for complete search history.

(56) References Cited

U.S. PATENT DOCUMENTS

| | | | |
|---|---|---|---|
| 5,307,642 A * | 5/1994 | Dean | F24F 5/0017 |
| | | | 62/201 |
| 5,355,688 A * | 10/1994 | Rafalovich | F24D 11/0214 |
| | | | 165/104.18 |
| 5,553,662 A | 9/1996 | Longardner et al. | |

FOREIGN PATENT DOCUMENTS

| | | |
|---|---|---|
| CN | 201852230 U | 6/2011 |
| CN | 102395833 A | 3/2012 |
| CN | 1825016 A | 8/2016 |
| DE | 3238333 A1 | 4/1984 |
| DE | 102005013012 A1 | 9/2006 |
| WO | 2010092391 A1 | 8/2010 |

OTHER PUBLICATIONS

State Intellectual Property Office of People's Republic China Search Report; Application No. 201280050081.5; Mailing Date: Mar. 7, 2016; 3 pages.

* cited by examiner

THERMAL ENERGY STORAGE IN A CHILLER SYSTEM

BACKGROUND OF THE INVENTION

The subject matter disclosed herein relates to air conditioning systems. More specifically, the subject disclosure relates to thermal energy storage (TES) systems for air conditioning systems, the commonest forms of which use stored chilled water or ice.

Ice storage is used in air conditioning systems, for example, chiller systems, to take advantage of the large enthalpy content of a volume of frozen water. TES systems that involve a phase change are able to utilize the enthalpy of that phase change in addition to the heat capacity of the medium. A traditional TES system can be used in conjunction with an air conditioning system, for example, a chiller system, to time shift the use of energy by charging and discharging the storage medium, (e.g., ice or water), at different times. For example, the medium can be re-charged during the nighttime by the chiller system when the chiller is not typically needed to cool a space, for example, a building or portion of a building. During the daytime, at least for a portion of the daytime, the ice storage unit is discharged to assist the chiller in providing cooling to the building The utilization of ice as a thermal energy storage medium requires the use of a brine solution circulating from the chiller through the ice storage unit to freeze the water in the unit. The brine, typically an ammonia or ethyl glycol solution, must have a freezing point below 32 degrees Fahrenheit or zero degrees Celsius. To freeze the water and charge the unit, the chiller must therefore chill the brine solution to below zero Celsius or 32 degrees Fahrenheit. Circulating refrigerant may also be used. The overall thermal efficiency of the compressor must be considered when operating to provide this lower temperature than that typically used in conventional air conditioning. Since during daytime operation the chiller is typically operated to provide cooling air at about 55 degrees Fahrenheit in a direct exchange (DX) system, it is inefficient to use the same chiller system to both make ice at 32 degrees Fahrenheit for the ice storage unit and also provide cooling air at the desired supply air temperature during normal operation of the chiller since the two different "lifts" would require different optimization.

Further, during daytime operation of the chiller, the heat from the work done by the chiller and the heat pumped from the building is discharged into the outside, ambient air. The chiller operates at a lower coefficient of performance since the "lift" needed to go from the coil entering refrigerant or chilled-water temperature to the ambient air temperature is higher than it typically would be at night when it rejects into cooler night time air.

BRIEF DESCRIPTION OF THE INVENTION

According to one aspect of the invention, a method of operating an air conditioning system includes operating a refrigeration unit to cool a volume of refrigerant and circulating the refrigerant to a heat exchanger. A serviced space is cooled via a thermal energy exchange between the serviced space and the refrigerant at the heat exchanger. Thermal energy generated by operation of the refrigeration unit is stored at a thermal energy storage system.

According to another aspect of the invention, an air conditioning system includes a refrigeration unit and a heat exchanger operably connected to the refrigeration unit. The heat exchanger is configured to transfer thermal energy between a serviced space and the refrigeration unit, thus cooling the serviced space. A TES medium such as a phase change material (PCM) is utilized to absorb thermal heat generated by the refrigeration unit for dissipation into the ambient environment at a selected time.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
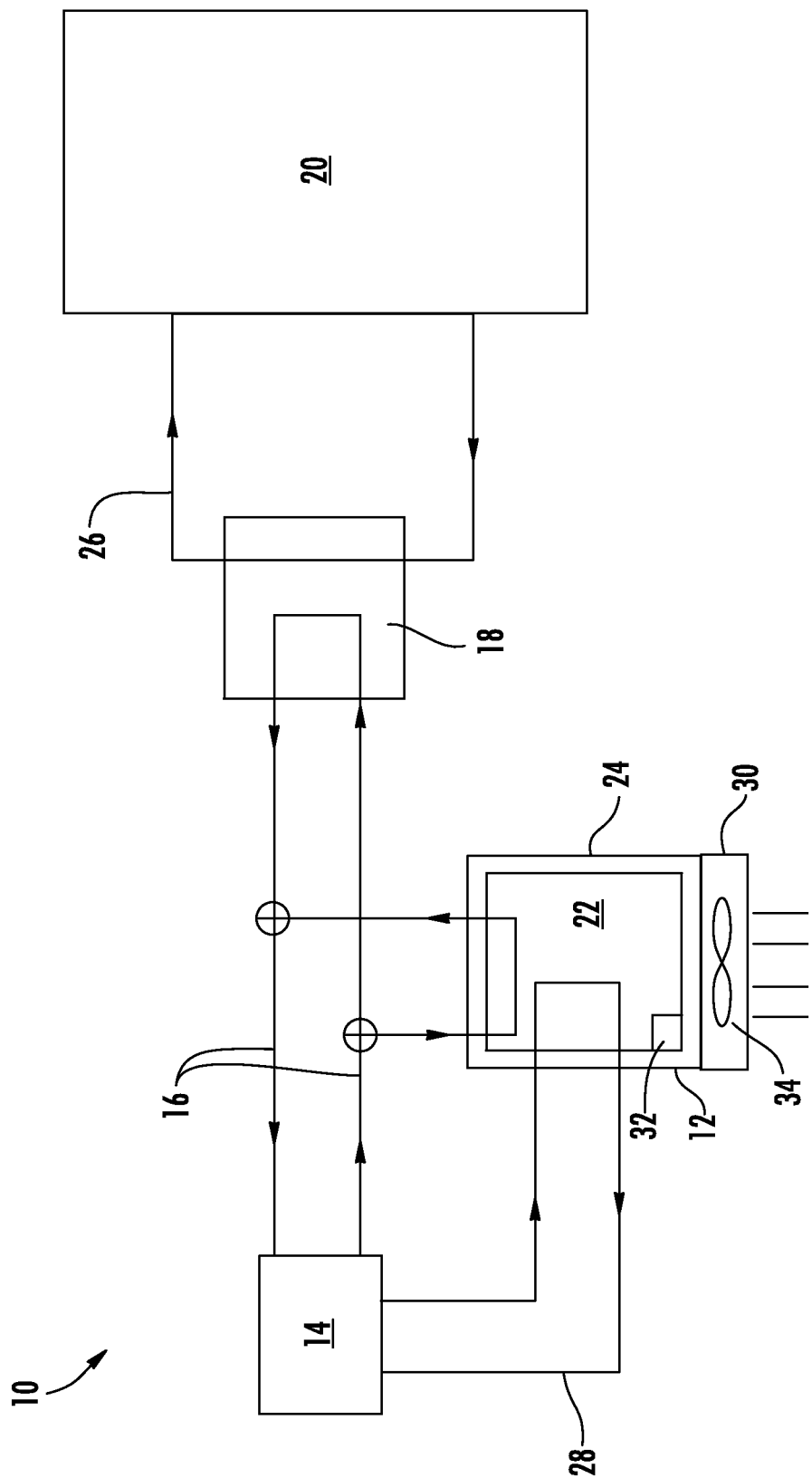
FIG. 1 is a schematic illustration of an embodiment of air conditioning system.

Shown in FIG. 1 is a schematic of an embodiment of an improved air conditioning system 10 including a thermal energy storage (TES) unit 12. The system 10 illustrated in FIG. 1 is a direct-exchange (DX) system 10. The TES unit 12 is connected to a refrigeration unit, for example, a chiller 14 via one or more refrigerant pathways 16 in which a refrigerant is circulated between the chiller 14 and the TES unit 12. The TES unit 12 is further connected to an evaporator heat exchanger 18, which exchanges thermal energy between a building 20, or other serviced space, and the TES unit 12.

The TES unit 12 utilizes a volume of phase change material (PCM) 22 to store thermal energy in a storage tank 24. The PCM 22 may be an organic wax material having a transition temperature higher than a typical nighttime temperature, or over about 32 degrees Fahrenheit or zero degrees Celsius, and lower than the typical daytime ambient air. The higher transition temperature of the PCM 22, when compared to a typical water/ice system, results in more efficient operation of the system 10 when charging or transitioning the PCM 22, in other words, when cooling the PCM 22.

FIG. 1 illustrates system operation of the system 10 during daytime, when the chiller 14 is operated to cool the building 20. The chiller 14 cools the refrigerant, which is conveyed to the evaporator heat exchanger 18 via the one or more refrigerant pathways 16. At the evaporator heat exchanger 18, the cooling energy of the brine solution in the refrigerant pathway 16 is converted to a flow of cooling air 26, which is distributed to the building 20 at a selected supply air temperature which, in some embodiments, is about 55 degrees Fahrenheit, or about 13 degrees Celsius. During operation of the chiller 14, the chiller 14 generates an amount of heat. In systems of the prior art, this heat is rejected directly to the daytime air by using a condenser in a DX system or a heat exchanger circulating water to a cooling tower in chilled water systems. The temperature difference between the cooled refrigerant and the outside daytime air is high, thus resulting in a lower coefficient of performance (COP) of the chiller and the system overall of the prior art. In the system 10 of FIG. 1, on the other hand, the heat generated by chiller 14 operation during the daytime is received by the TES unit 12, specifically the PCM 22, via one or more chiller exhaust pathways 28. The "lift" is lower and the COP is higher. If the outside air temperature is cool enough during early daytime hours, due to a cool night, that the outside air temperature is lower than the PCM 22 temperature, the chiller 14 may be run until the outside air temperature exceeds the PCM 22 transition temperature, at which time the chiller 14 may be shut off and the PCM 22 utilized as described above. At any given time, the decision to use the chiller 14 or the PCM 22 may be made depending on the size of the TES unit 12, predicted weather and cooling needed for a selected period, cost of power at the particular time of day, efficiency of the chiller 14 at the operating temperatures needed, or the like.

The heat is retained in the PCM 22 until nighttime, when the outside ambient temperature is lower. The heat is then rejected to the nighttime air, using an economizer 30, expending only pump 32 and/or fan 34 energy to do so. Expelling the stored thermal energy during nighttime is advantageous because the temperature difference between the nighttime air and the cooled refrigerant is lower, thus resulting in an increased COP of the system 10 compared to that of the prior art. For the remainder of the nighttime, the PCM 22 in the TES unit 12 is cooled, or recharged, either by the ambient nighttime air directly and/or via operation of the chiller 14, since the chiller 14 generally not used to provide building cooling during the nighttime. Heat generated by operation of the chiller 14 during this nighttime operation to recharge the PCM may be expelled directly into the nighttime air. This is not only more energy efficient due to the lower "lift" than needed in daytime operation, but also in areas with time-of-day electric rates the cost of the energy used will be lower.

Figure 2:
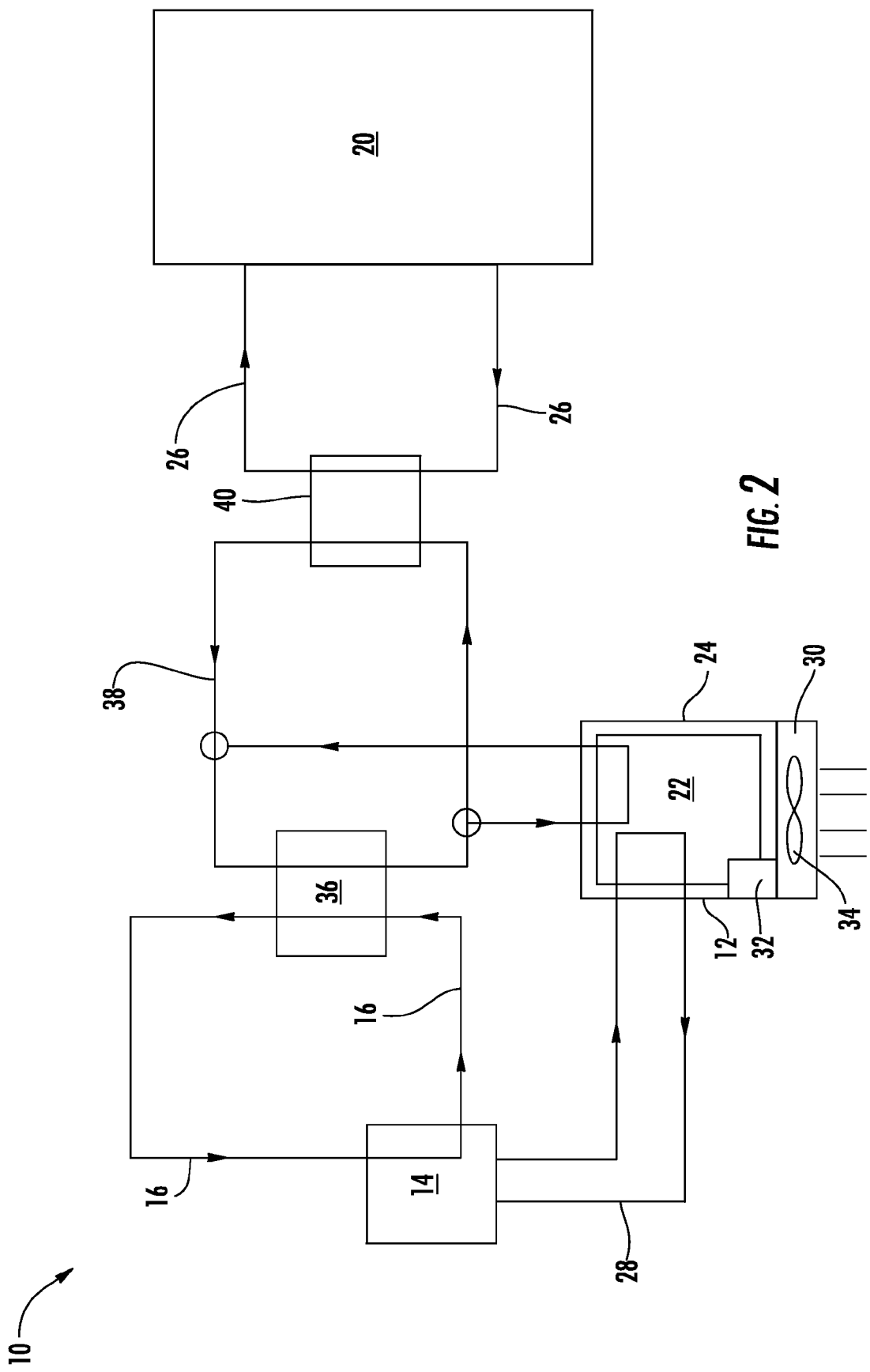
FIG. 2 is a schematic illustration of another embodiment of an air conditioning system.

Another embodiment of an air conditioning system 10 is shown in FIG. 2. In this embodiment, the chiller 14 circulates refrigerant to an air handler heat exchanger 36 via one or more refrigerant pathways 16. At the air handler heat exchanger 36, thermal energy is exchanged between the refrigerant and a flow of a brine solution, for example, an ammonia or ethyl glycol solution, circulated in one or more brine pathways 38. The cooled brine is circulated to an air handler 40, which utilizes the brine to cool the building 20, or other serviced space.

A TES unit 12 is connected to the brine pathways 38, to allow for circulation of brine solution through the TES unit 12 when desired. The chiller 14 is also connected to the TES unit 12 via one or more chiller exhaust pathways 28 so that heat generated during operation of the chiller 14 may be transferred to the PCM 22, then rejected to the nighttime air using the economizer 30. For the remainder of the nighttime, the PCM 22 in the TES unit 12 is cooled, or recharged, either by the ambient nighttime air directly and/or via operation of the chiller 14 by the circulation of cooled brine therethrough.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating an air conditioning system comprising:
    operating a refrigeration unit to cool a volume of refrigerant;
    circulating the refrigerant to a heat exchanger;
    cooling a serviced space via a thermal energy exchange between the serviced space and the refrigerant at the heat exchanger; and
    storing thermal energy generated by operation of the refrigeration unit at a thermal energy storage system;
    wherein storing thermal energy at the thermal energy storage system includes causing a phase change of a volume of phase change material having a transition temperature greater than the typical nighttime temperature experienced by the system, and less than the typical daytime temperature experienced by the system.

2. The method of claim 1, wherein the transition temperature is greater than 32 degrees Fahrenheit.

3. The method of claim 1, further comprising dissipating the thermal energy from the thermal energy storage system at a selected time.

4. The method of claim 3, further comprising at least partially recharging the thermal energy storage system.

5. The method of claim 4, further comprising at least partially recharging the thermal energy storage system via a flow of nighttime ambient air.

6. The method of claim 4, further comprising at least partially recharging the thermal energy storage system via operation of the refrigeration unit.

7. The method of claim 6, further comprising urging cooled refrigerant from the refrigeration unit through the thermal energy storage system.

8. An air conditioning system comprising:
    a refrigeration unit;
    a heat exchanger operably connected to the refrigeration unit to transfer thermal energy between a serviced space and the refrigeration unit, thus cooling the serviced space; and
    a volume of thermal energy storage medium to absorb thermal heat generated by the refrigeration unit for dissipation into the ambient environment at a selected time;
    wherein the volume of thermal energy storage medium comprises a phase change material having a transition temperature greater than the typical nighttime temperature experienced by the system, and less than the typical daytime temperature experienced by the system.

9. The system of claim 8, wherein the transition temperature is greater than 32 degrees Fahrenheit.

10. The system of claim 8, wherein the phase change material is an organic wax material.

11. The system of claim 8, wherein the selected time is nighttime.

12. The system of claim 8, wherein the refrigeration unit is a chiller.

13. The system of claim 8, wherein the thermal energy storage system is at least partially recharged by nighttime ambient air after discharge of the thermal heat.

14. The system of claim 8, wherein the thermal energy storage system is at least partially recharged by operation of the refrigeration unit after discharge of the thermal heat.

* * * * *